(12) United States Patent
Warriner

(10) Patent No.: US 12,063,912 B1
(45) Date of Patent: Aug. 20, 2024

(54) AQUARIUM WITH A DIGITAL DISPLAY

(71) Applicant: Andrae Warriner, Suluphur, LA (US)

(72) Inventor: Andrae Warriner, Suluphur, LA (US)

( * ) Notice: Subject to any disclaimer, the term of this patent is extended or adjusted under 35 U.S.C. 154(b) by 41 days.

(21) Appl. No.: 17/981,109

(22) Filed: Nov. 4, 2022

(51) Int. Cl.
*A01K 63/00* (2017.01)
*G06F 3/14* (2006.01)
*G06F 3/041* (2006.01)

(52) U.S. Cl.
CPC .............. *A01K 63/006* (2013.01); *G06F 3/14* (2013.01); *G06F 3/041* (2013.01)

(58) Field of Classification Search
USPC ......... 119/245, 251, 253, 256–258, 267, 269
See application file for complete search history.

(56) References Cited

U.S. PATENT DOCUMENTS

| | | | | |
|---|---|---|---|---|
| 1,991,683 | A * | 2/1935 | Kelly | A01K 63/003 119/253 |
| 2,736,791 | A * | 2/1956 | Krah | H05B 3/80 D23/316 |
| 2,879,742 | A * | 3/1959 | Morrill | A01K 63/003 119/258 |
| 3,121,417 | A * | 2/1964 | Goldman | A01K 63/006 40/594 |
| 3,730,138 | A * | 5/1973 | Suchowski | A01K 63/006 119/253 |
| 3,763,997 | A | 10/1973 | Willinger | |
| 3,992,811 | A * | 11/1976 | Yellin | B44D 3/00 D7/557 |
| 4,353,327 | A * | 10/1982 | Shroyer | A01K 63/003 40/725 |
| 4,783,258 | A * | 11/1988 | Willinger | A01K 63/045 210/232 |
| 5,067,059 | A * | 11/1991 | Hwang | F21S 10/005 362/101 |

(Continued)

FOREIGN PATENT DOCUMENTS

| | | | | |
|---|---|---|---|---|
| CA | 2480685 | C * | 5/2011 | ........... A01K 63/045 |
| GB | 2268383 | A * | 1/1994 | ........... A01K 63/006 |

(Continued)

OTHER PUBLICATIONS

Merged translation of WO-9006051-A1 (Year: 1990).*

(Continued)

*Primary Examiner* — Morgan T Jordan
(74) *Attorney, Agent, or Firm* — Sanchelima & Associates, P.A.; Jesus Sanchelima; Christian Sanchelima

(57) ABSTRACT

An aquarium with a digital display including a fish tank assembly, a screen assembly and a fastening assembly. Container assembly has a cuboid shape with a top opening and has a watertight seal. The container is configured to hold water. Screen assembly includes a digital display removably attached to a rear side of the container, wherein the digital display is capable of projecting elements of multimedia. Digital display is further configured to be operatively connected to a wireless device, thereby the digital display is actuated by means of the wireless device. Fastening assembly includes top clamps and bottom clamps, wherein are configured to attach the digital display to the rear side of the container by means of adjustable apertures of the top clamps and bottom clamps.

7 Claims, 4 Drawing Sheets

(56) References Cited

U.S. PATENT DOCUMENTS

Figure 1:
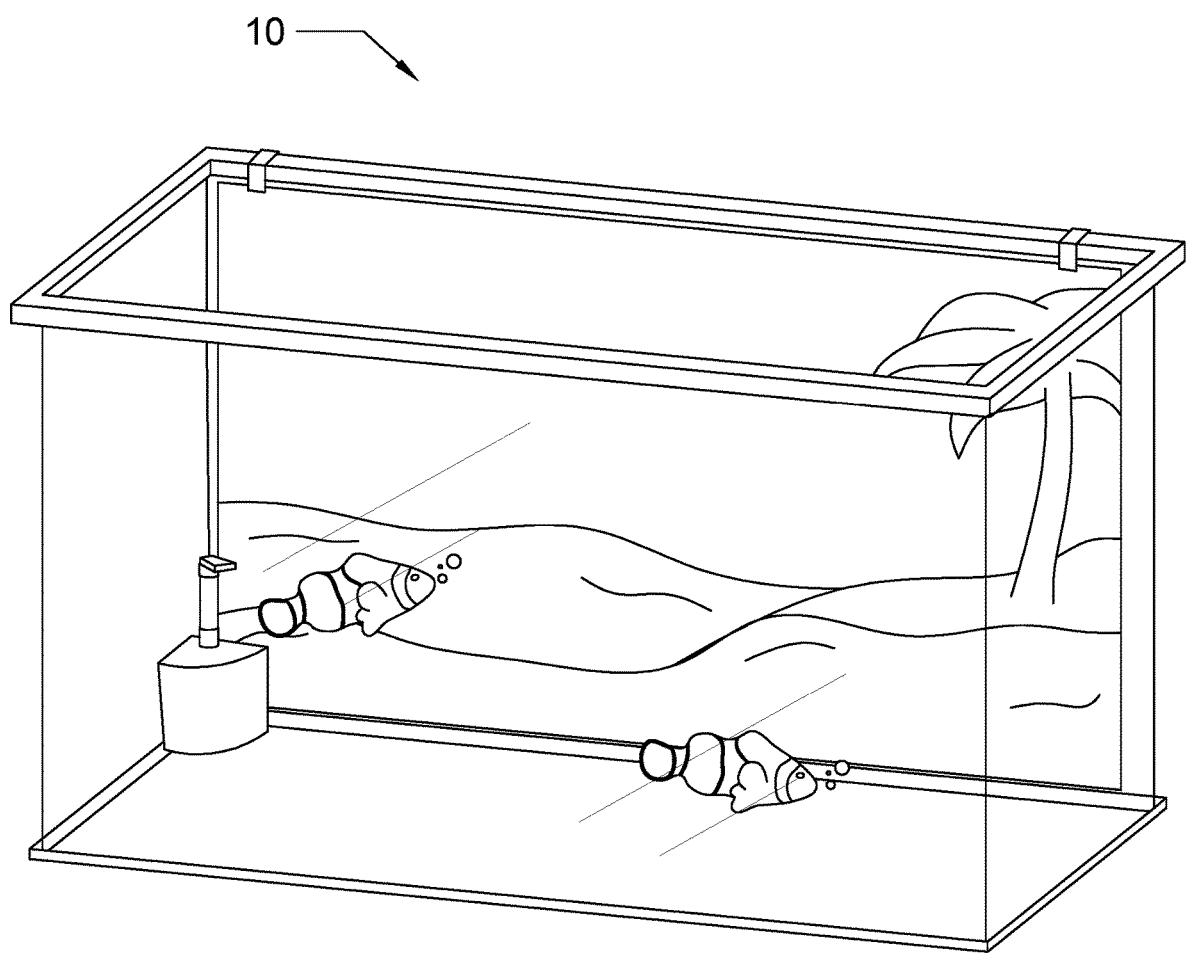

| | | | | |
|---|---|---|---|---|
| 5,078,093 | A * | 1/1992 | Flaherty | A01K 63/006 40/649 |
| 5,090,357 | A * | 2/1992 | Pucci | A01K 63/006 30/106 |
| 5,365,886 | A * | 11/1994 | Frost, Jr. | A01K 63/003 119/267 |
| 5,490,481 | A * | 2/1996 | Strong | A01K 63/006 119/259 |
| 5,649,757 | A * | 7/1997 | Aleman | A01K 63/06 362/253 |
| 5,749,320 | A * | 5/1998 | Sydenstricker | A01K 63/006 119/253 |
| 5,855,982 | A * | 1/1999 | Wechsler | A01K 63/006 47/69 |
| 6,327,997 | B1 * | 12/2001 | Terry | A01K 1/03 119/254 |
| 6,415,739 | B1 * | 7/2002 | Orendorff | A01K 63/003 40/406 |
| 6,505,428 | B1 * | 1/2003 | Williams-King | G09F 1/10 119/253 |
| 6,742,477 | B1 | 6/2004 | Marraudino | |
| 8,720,377 | B1 * | 5/2014 | McLean | A01K 63/006 119/225 |
| 8,943,725 | B2 * | 2/2015 | Gotzy | A47F 3/00 40/538 |
| 2002/0083901 | A1 * | 7/2002 | Rudolph | A01K 63/006 119/256 |
| 2005/0178339 | A1 * | 8/2005 | Choe | A01K 63/003 119/257 |
| 2007/0101942 | A1 * | 5/2007 | Smith | A01K 63/006 119/253 |
| 2007/0119381 | A1 * | 5/2007 | Chang | A01K 63/003 119/264 |
| 2007/0234967 | A1 * | 10/2007 | Margerum | A01K 63/003 119/257 |
| 2007/0278144 | A1 * | 12/2007 | Wong | B01D 19/02 210/167.26 |
| 2009/0139457 | A1 * | 6/2009 | Luong | A01K 63/02 119/245 |
| 2009/0147502 | A1 * | 6/2009 | Aleman | A47F 3/001 362/310 |
| 2010/0212598 | A1 * | 8/2010 | Jones | F16K 21/185 137/412 |
| 2013/0233779 | A1 * | 9/2013 | Farrish | C02F 3/322 210/150 |
| 2014/0116346 | A1 * | 5/2014 | Lutz | A01K 63/003 119/269 |
| 2016/0000053 | A1 * | 1/2016 | Stime, Jr. | A01K 63/047 119/245 |
| 2016/0335933 | A1 * | 11/2016 | Claire | A01K 63/06 |
| 2018/0103614 | A1 * | 4/2018 | Tsai | A01K 1/035 |
| 2019/0059340 | A1 * | 2/2019 | Brown | B32B 27/08 |

FOREIGN PATENT DOCUMENTS

| | | | | |
|---|---|---|---|---|
| KR | 0131880 | Y1 * | 1/1999 | |
| KR | 200440133 | Y1 * | 5/2008 | |
| KR | 101076210 | B1 * | 10/2011 | |
| WO | WO-9006051 | A1 * | 6/1990 | |
| WO | WO-9105465 | A * | 5/1991 | A01K 63/006 |
| WO | WO-2012067296 | A1 * | 5/2012 | A01K 63/06 |

OTHER PUBLICATIONS

Merged translation of WO-9105465-A (Year: 1991).*
Merged translation of KR-0131880-Y1 (Year: 1999).*
Merged translation of KR-200440133-Y1 (Year: 2008).*
Merged translation of CA-2480685-C (Year: 2011).*
Merged translation of KR-101076210-B1 (Year: 2011).*
Merged translation of WO-2012067296-A1 (Year: 2012).*

* cited by examiner

AQUARIUM WITH A DIGITAL DISPLAY

II. BACKGROUND OF THE INVENTION

1. Field of the Invention

The present invention relates to an aquarium and, more particularly, to an aquarium with a digital display that includes a digital background on the back of the aquarium, projecting a variety of images or video through the transparent panel of the aquarium.

2. Description of the Related Art

Several designs for aquariums have been designed in the past. None of them, however, include a digital display therein where is mounted on the back side of the aquarium by means of clamps, thereby the digital display may project a predetermined variety of images or videos by means of a remote control or a wireless device operatively connected thereof.

Applicant believes that a related reference corresponds to U.S. Pat. No. 6,742,477 issued for decorative background assembly with illustrated display panel, fluorescent light, and mirror, for use with an aquarium. Applicant believes that another related reference corresponds to U.S. Pat. No. 3,763,997 issued for a decorative display configured to mount to the rear of an aquarium. None of these references, however, teach of a mountable electronic display with a plurality of clamps to attach to the tank, having circuitry for displaying a variety of images, wherein the screen is positioned on the back of the aquarium and projects images toward the transparent front panel of the aquarium.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a digital display that is actuated by wireless device.

It is another object of this invention to provide an aquarium with a digital background that projects elements of multimedia.

It is still another object of the present invention to provide a digital display that can be removably attached to a rear side of an aquarium.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of an exemplary embodiment of the present invention 10.

Figure 2:
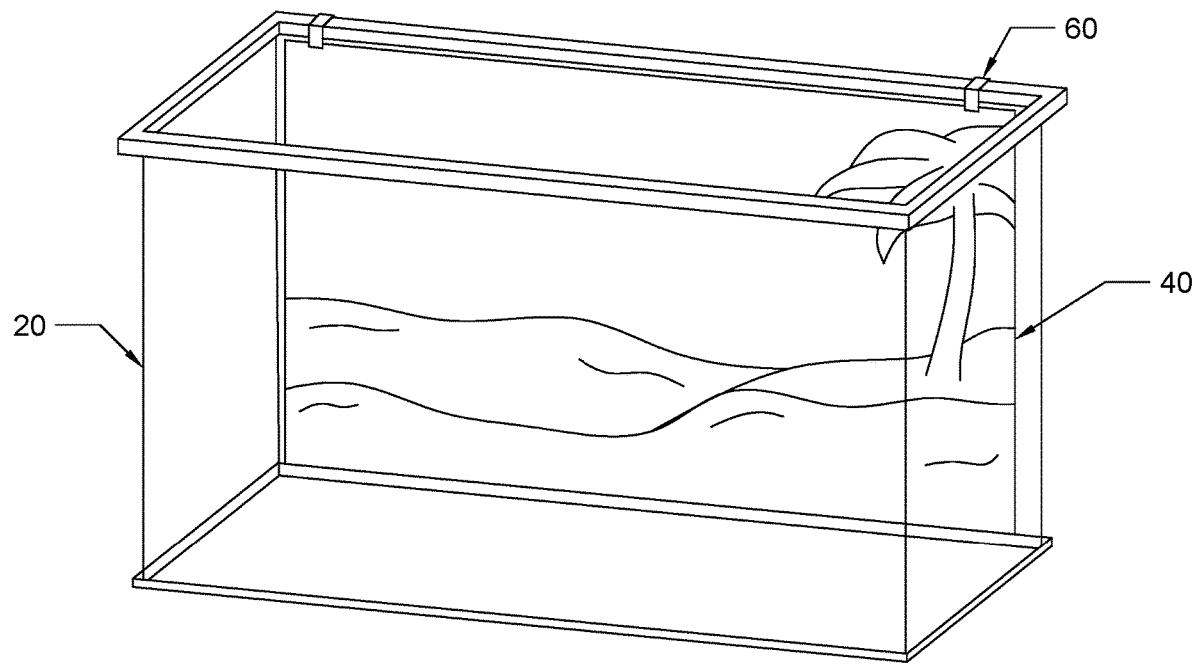

FIG. 2 shows an isometric view of the present invention 10, wherein the screen assembly 40 is mounted on a rear side of the fish tank assembly 20 by means of the fastening assembly 60.

Figure 3:
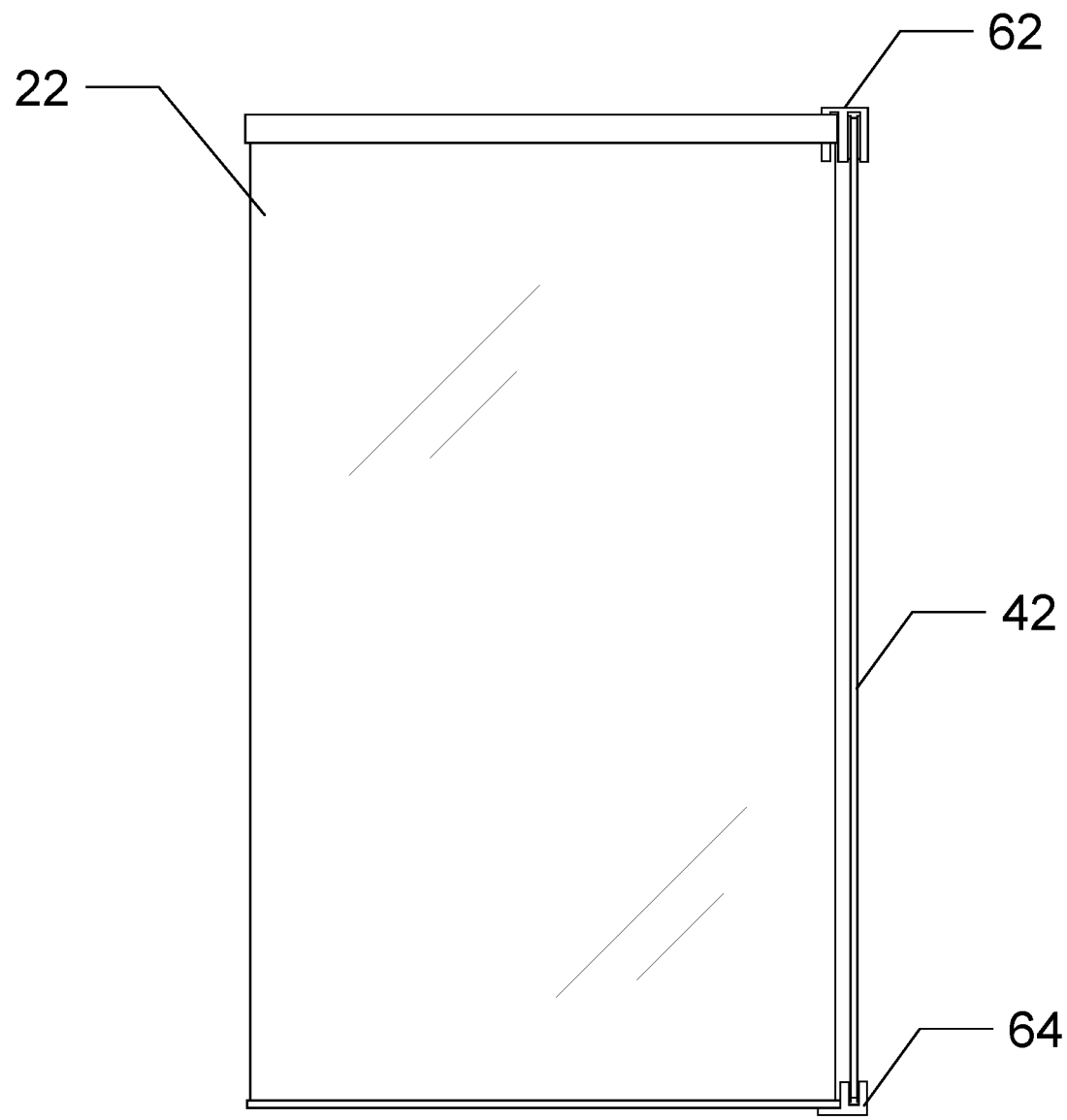

FIG. 3 illustrates a side view of the present invention 10 showing how the fastening assembly 60 is placed on the rear side of the container 22 while holding the digital display 42.

Figure 4:
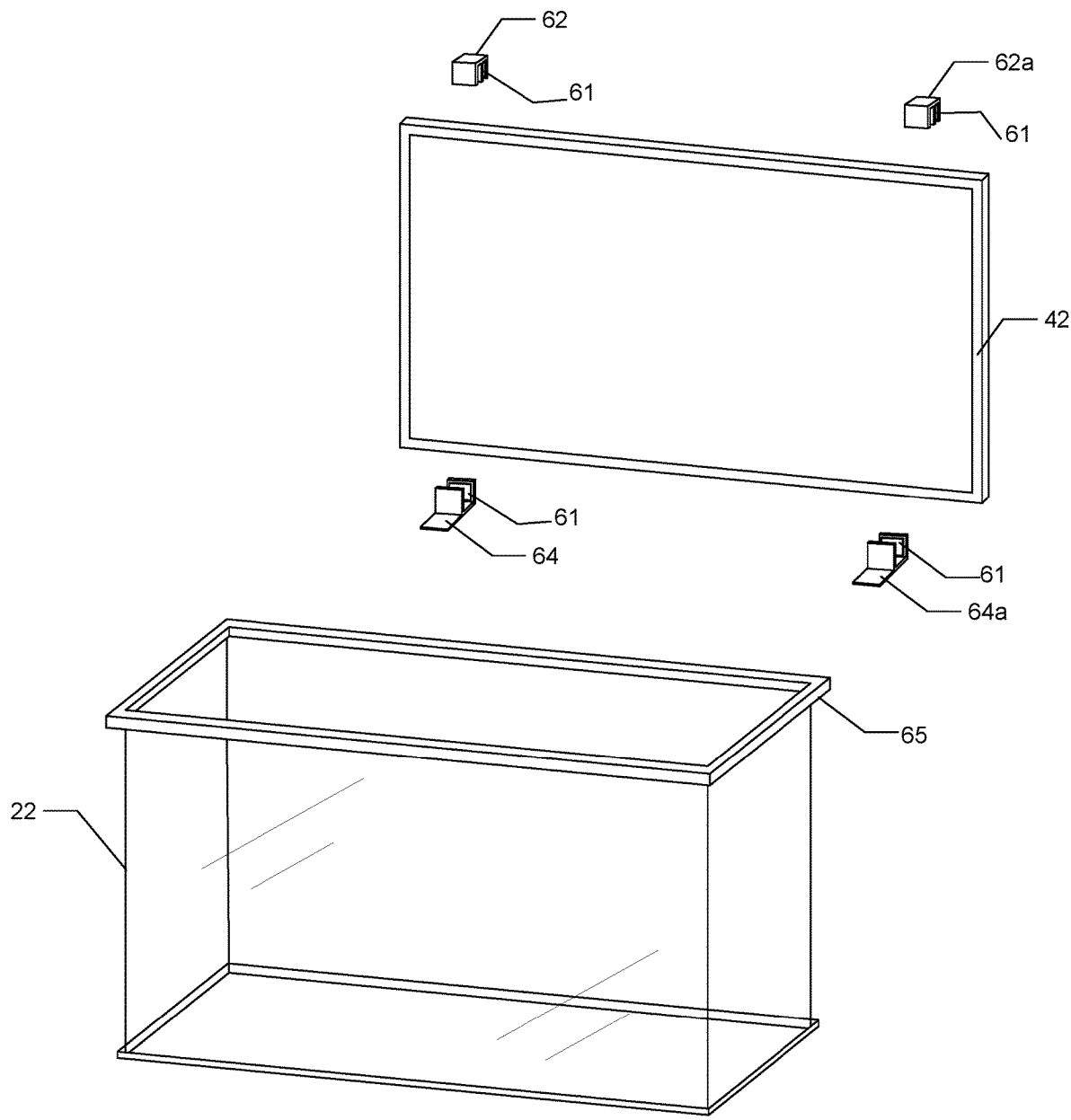

FIG. 4 is a representation of an exploded view of the present invention 10.

V. DETAILED DESCRIPTION OF THE EMBODIMENTS OF THE INVENTION

Referring now to the drawings, where the present invention is generally referred to with numeral 10, it can be observed that it basically includes fish tank assembly 20, screen assembly 40 and a fastening assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Fish tank assembly includes a container 22, wherein the container is configured to hold water. In an exemplary embodiment, the container 22 may have a cuboid shape, wherein said cuboid shape may have a hollow body with an opening on top thereof. Nevertheless, it should be considered that container 22 may be formed by a plurality of walls attached therebetween to conform with the shape of the cubic shape. In a suitable embodiment, the container 22 may be made of a glass material, an acrylic material or any other variation thereof, in a preferred embodiment, the container 22 may have a plastic frame 65 placed around the base and top periphery of the container 22 preventing the edges thereof from being damaged. As illustrated in FIG. 2. The container 22 once filled with a predetermined volume of water may be watertight.

Screen assembly 40 includes a digital display 42, wherein the digital display 42 may be mounted in a rear side of the container 22. In a suitable embodiment, digital screen 42 may have an area that conforms with the area of the rear side of the container 22, nevertheless it should be considered that digital display 42 may have a smaller area than the rear side of the container 22. In a preferred embodiment, digital display 42 may project elements of multimedia by means of an integrated internal storage device, nonetheless, digital display 42 may project elements of multimedia stored in an external storage device removably attached to the digital display 42. In other embodiment, an external device may be operatively connected to the digital display, wherein in the digital display 42 may be actuated by the external device by means of a wireless signal emitted and received by the digital display. Nevertheless, it should be considered that digital display 42 may have a touch screen that is configured to interact with the user, wherein the digital display is capable to be connected to a wireless internet signal, allowing the user to project predetermined elements of multimedia, thereby the predetermined element of multimedia projected by the digital screen 42 may be visible through the transparent sides of the container 22. Best depicted in FIG. 1.

Fastening assembly includes a top clamp and a bottom clamp, wherein both top clamp and bottom clamp are coupled in a portion of the rear side of the container 22 and are configured to support the digital display in a centered area of the rear side of the container 22. In an exemplary embodiment, top clamp 62 may have a U-shape with a double channel, wherein a channel thereof may have a suitable channel thickness to be fitted in a top portion of the rear side of the container 22, where the top edge of the rear side abuts against the base of the channel. Another channel of the top clamp 62 may have an adjustable wall, wherein the adjustable wall may slide through the base of the top clamp allowing the digital screen to be secure, thereby the top clamp is adjusted to receive a digital display in its various embodiments. As illustrated in FIG. 3. In a preferred embodiment, top clamp 62 may be made of a plastic material, a steel material, an aluminum alloy or any other variation thereof. It should be considered that in a portion of the walls configured to receive the digital display 42, may have a pad member 61, thereby preventing the digital display from being damaged due to the roughness of the clamp material. In an exemplary embodiment, bottom clamp 64 may have a base with a U-shape perpendicular to the base placed in an edge thereof. In a suitable embodiment the base is configured to be placed in a bottom portion of the container 22, wherein the U-shape is placed parallel to the rear side of the container 22. A channel formed by the U-shape of the bottom clamp is configured to receive a portion of the digital display 42, wherein a wall of the bottom clamp 64 is adjustable by sliding through the base of the bottom clamp 64, thereby the bottom clamp 64 may be capable receive the digital display 42 in its various embodiments. As shown in FIG. 3. In one embodiment, bottom clamp 64 may be made of a plastic material, a steel material, an aluminum alloy or any other variation thereof. It should be considered that a portion of the bottom wall clamp is configured to receive the digital display 42, may have a pad member 61, therefore preventing the digital display from being damaged due to the roughness of the clamp material.

FIG. 4 illustrates the screen assembly 40 being mounted on a rear side of the container 22 by means of a top clamp 62. It should be considered that a plurality of top clamps 62a may be coupled in the container 22. In other embodiment, bottom clamp 64 may be placed in a bottom side of the container, wherein the bottom clamp 64 is configured to receive a portion of the digital display 42, nonetheless, it should be considered that a plurality of bottom clamp 64a may be placed on the bottom side of the container 22, thereby the screen display may be secured and centered with respect to the rear side of the container 22 by means of the fastening assembly 60.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An aquarium with a digital display, comprising:
   a fish tank assembly including a container, wherein said container has a cuboid shape, said container has an opening area, said container is watertight, wherein said container has a plastic frame around a top periphery and around a bottom periphery thereof;
   a screen assembly having a digital display, wherein said digital display has a shape that conforms with the shape of a rear side of said container, said digital display is removably attached to said rear side; and
   a fastening assembly including top clamps and bottom clamps, wherein said top clamps are mounted in a top portion of said rear side, said top clamps have a double channel, a portion of said bottom clamp is placed underneath a bottom side of said container, wherein a portion of said bottom clamp is placed parallel to said rear side, said bottom clamp has a base, said base has a receiving portion, said receiving portion receives said digital display, said top clamp has a U-shape with the double channel, wherein a first channel of the double channel fits over a wall of said container and a second channel of the double channel receives said digital display, wherein the second channel of the double channel has an adjustable wall, said adjustable wall is slidable to secure said digital display, said double channel has pads in a portion of walls of said double channel.

2. The aquarium with a digital display of claim 1, wherein said digital display stores elements of multimedia by means of an integrated storage device, wherein said digital display projects said elements of multimedia.

3. The aquarium with a digital display of claim 1, wherein said digital display receives an external storage device, wherein digital display projects said elements of multimedia from said external storage device.

4. The aquarium with a digital display of claim 1, wherein an external device is operatively connected to said digital display, said digital display is actuated by means of said external device.

5. The aquarium with a digital display of claim 1, wherein said bottom clamp has a base with a U-shape perpendicular to the base placed in an edge thereof, wherein said U-shape forms a channel, wherein said channel receives a bottom portion of said digital display.

6. An aquarium with a digital display, comprising:
   a fish tank assembly including a container, wherein said container has a cuboid shape, said container has an opening area, said container is watertight, wherein said container is made of transparent glass, said container has a plastic frame around a top periphery thereof;
   a screen assembly having a digital display, wherein said digital display has a shape that conforms with the shape of a rear side of said container, said digital display is removably attached to said rear side, said digital display projects elements of multimedia by means of an integrated storage device, said digital display is configured to receive an external storage device to project elements of multimedia stored therein; and
   a fastening assembly including top clamps and bottom clamps, wherein said top clamps are mounted in a top portion of said rear side, each of said top clamps has a U-shape with a double channel, wherein a first channel of the double channel receives a portion of said digital display, each of said bottom clamps has a base with a U-shape in a edge thereof, a channel is formed by said U-shape of said bottom clamps, said channel of each of the bottom clamps receives a portion of said digital display.

7. An aquarium system with a digital display, consisting of:
   a fish tank assembly including a container, wherein said container has a cuboid shape, said container has an opening area, said container is watertight, wherein said container is made of transparent glass, said container has a plastic frame around the top periphery and around a bottom periphery thereof;
   a screen assembly having a digital display, wherein said digital display has a shape that conforms with the shape of a rear side of said container, said digital display is removably attached to said rear side, said digital display projects elements of multimedia by means of an integrated storage device, said digital display is configured to receive an external storage device to project elements of multimedia stored therein, an external remote device is operatively connected to said digital display, said digital display is actuated by means of said external remote device, said digital display has a touch screen, wherein said touch screen is configured to interact with an user; and a fastening assembly including top clamps and bottom clamps, wherein said top clamps are mounted in a top portion of said rear side, each of said top clamps has a U-shape with a double channel, wherein a second channel of the double channel receives a portion of said digital display, wherein the second channel of the double channel has an adjustable wall said adjustable wall is slidable to secure said digital display, a first channel of the double channel fits over a wall of said container, said channel has pads attached on the walls of said channel configured to receive a portion of said digital display, each of said bottom clamps has a base with a U-shape in an edge thereof, said base is configured to be placed underneath a portion of said container, said U-shape is placed parallel to said rear side of said container, a channel is formed said U-shape of each of said bottom clamps, said channel of each of the bottom clamps receives a bottom portion of said digital display, said channel of said bottom clamp has pads.

\* \* \* \* \*